US012673529B2

(12) United States Patent
Terai et al.

(10) Patent No.: US 12,673,529 B2
(45) Date of Patent: Jul. 7, 2026

(54) VEHICLE AIR CONDITIONING DUCT DEVICE

(71) Applicant: TOYODA GOSEI CO., LTD., Kiyosu (JP)

(72) Inventors: Nobuhiro Terai, Kiyosu (JP); Akane Nagasaka, Kiyosu (JP); Tomoko Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 354 days.

(21) Appl. No.: 18/448,419

(22) Filed: Aug. 11, 2023

(65) Prior Publication Data

US 2024/0109395 A1 Apr. 4, 2024

(30) Foreign Application Priority Data

Sep. 29, 2022 (JP) ................................. 2022-157162

(51) Int. Cl.
*B60H 1/00* (2006.01)

(52) U.S. Cl.
CPC ..... *B60H 1/00564* (2013.01); *B60H 1/00028* (2013.01); *B60H 1/00678* (2013.01); *B60H 2001/00192* (2013.01)

(58) Field of Classification Search
CPC ............ B60H 1/00564; B60H 1/00028; B60H 1/00678; B60H 1/0055; B60H 1/242; B60H 1/28
USPC ........................................................ 296/208
See application file for complete search history.

(56) References Cited

U.S. PATENT DOCUMENTS 4,633,770 A * 1/1987 Taylor ..................... F24F 13/08
                                                      454/316
6,123,377 A 9/2000 Lecher et al.
7,238,103 B2 * 7/2007 Terai ................... B60H 1/3414
                                                      454/155

FOREIGN PATENT DOCUMENTS

CN          206049297 U    3/2017
JP          S58-167234 U   11/1983
JP          2000-079820 A  3/2000
JP          2002-121769 A  4/2002
                  (Continued)

OTHER PUBLICATIONS

Japanese Office Action mailed Jun. 3, 2025 in corresponding Japanese Patent Application 2022-157162 (and English machine translation).
                  (Continued)

*Primary Examiner* — Amy R Weisberg
*Assistant Examiner* — Philip C Adams
(74) *Attorney, Agent, or Firm* — Posz Law Group, PLC

(57) ABSTRACT

A technology that further improves an air conditioning function of a vehicle air conditioning duct device 1 is provided. The vehicle air conditioning duct device 1 includes: a housing 2 disposed on a lateral side of a seat and on a side opposite to a vehicle door with respect to the seat; a blowout port 3 provided at a position, in the housing 2, between a vehicle compartment floor upper surface 93 and a seat surface 94 of the seat; and a duct 4 having therein a flow path 40 for conditioned air, the duct 4 being disposed inside the housing 2 and connected to a vehicle air conditioner and the blowout port 3. The vehicle air conditioning duct device 1 is configured to blow out the conditioned air from the blowout port 3 obliquely forward with respect to the seat.

1 Claim, 6 Drawing Sheets

(56)　　　　　　　References Cited

FOREIGN PATENT DOCUMENTS

| | | | |
|---|---|---|---|
| JP | 2003-080938 | A | 3/2003 |
| JP | 2017-109707 | A | 6/2017 |

OTHER PUBLICATIONS

Office Action issued Nov. 18, 2025 in corresponding Japanese patent application No. 2022-157162 (and English machine translation).

* cited by examiner

Fig. 7

VEHICLE AIR CONDITIONING DUCT DEVICE

TECHNICAL FIELD

The present invention relates to a vehicle air conditioning duct device for heating and cooling a vehicle.

BACKGROUND ART

A general vehicle has mounted thereto a vehicle air conditioning system for performing heating and cooling. The vehicle air conditioning system is also considered as a device for supplying conditioned air obtained by a vehicle air conditioner, to a vehicle compartment through a vehicle air conditioning duct device.

In recent years, in order to cause the temperature environment in a vehicle compartment to be more comfortable for an occupant, supplying conditioned air to various places in the vehicle compartment by a vehicle air conditioning system has been proposed.

For example, in winter, the occupant often feels coldness in the vicinity of the lower body, in particular, the feet, of the occupant. Therefore, many vehicles are provided with a vehicle air conditioning duct device for foot for heating the feet of the occupant sitting on a seat.

In the above-described vehicle air conditioning duct device for foot, a foot blowout port thereof is disposed on the lower side of an instrument panel. From the blowout port, conditioned air, in particular, warm air, is supplied below a seat, i.e., toward the toes of the occupant sitting on the seat.

Here, in general, an occupant wears shoes also in the vehicle compartment. Therefore, the toes of the occupant are less likely to be warmed even under warm air.

For example, in cold weather, about 10 minutes are considered to be necessary until warming up of the vehicle air conditioner is completed after start of the vehicle, warm air is produced, and further, the occupant feels warmth at the feet.

In recent years, a technology for providing air conditioning not only to the toes of an occupant but also to a relatively large range in the vicinity of the feet of the occupant has been proposed.

For example, JP2000-79820(A) discloses a vehicle air conditioning duct device having a rear front-blowout-port 2 and a rear rear-blowout-port 3. The rear front-blowout-port 2 is provided at a lower part of a front seat in the vehicle, and warm air is blown out from the rear front-blowout-port 2 toward the toes of an occupant sitting on a rear seat. The rear rear-blowout-port 3 is provided at a lower part of a rear seat, and warm air is blown out from the vicinity of the feet toward the knees of the occupant sitting on the rear seat.

SUMMARY OF INVENTION

Technical Problem

For improvement of heat sensation at the toes, warming a portion where thick blood vessels are present and/or a portion where veins and lymph nodes are present in the body of the occupant, is effective. From this viewpoint, in cold weather, warming the vicinity of the calves of an occupant is considered to enable the occupant to quickly perceive warmth.

With a vehicle air conditioning duct device as disclosed by JP2000-79820(A) described above, the vicinity of the knees of the occupant is warmed. Accordingly, with the vehicle air conditioning duct device, the occupant is considered to relatively quickly perceive warmth.

However, even with such a vehicle air conditioning duct device, the occupant perceives chilliness or coldness at the feet in cold weather, and the occupant is in a situation where the occupant is far from being sufficiently comfortable in some cases.

The present invention has been made in consideration of the circumstances above. An object of the present invention is to provide a technology that further improves an air conditioning function of a vehicle air conditioning duct device.

Solution to Problem

A vehicle air conditioning duct device of the present invention solving the problem described above is a vehicle air conditioning duct device including:

a housing disposed on a lateral side of a seat and on a side opposite to a vehicle door with respect to the seat;

a blowout port provided at a position, in the housing, between a vehicle compartment floor upper surface and a seat surface of the seat; and a duct having therein a flow path for conditioned air, the duct being disposed, at least partially, inside the housing and connected to a vehicle air conditioner and the blowout port, the vehicle air conditioning duct device being configured to blow out the conditioned air from the blowout port obliquely forward with respect to the seat.

The vehicle air conditioning duct device of the present invention has a further-improved air conditioning function.

BRIEF DESCRIPTION OF DRAWINGS

FIG. 7 illustrates a result of Test Example 2;

DESCRIPTION OF EMBODIMENTS

Figure 1:
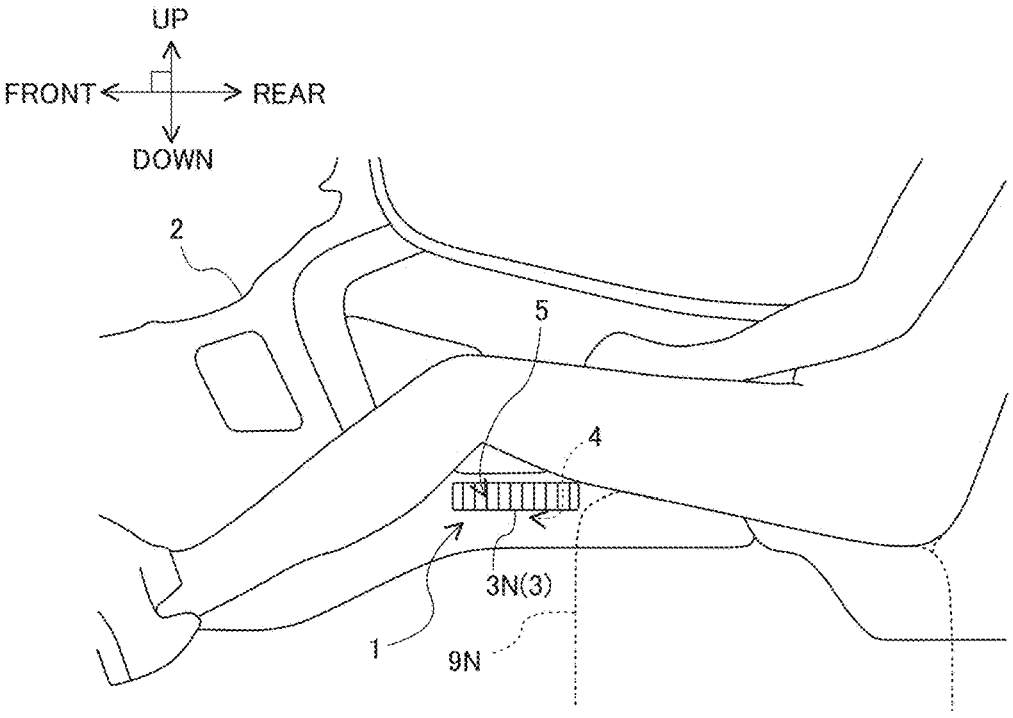
FIG. 1 schematically illustrates, in a side view, a vehicle air conditioning duct device of Example 1 in a vehicle compartment.

In short, in a vehicle air conditioning duct device of the present invention, a housing provided with a blowout port thereof is disposed on a lateral side of a seat and on a side opposite to a vehicle door with respect to the seat, and the blowout port is provided at a position, in the housing, between a vehicle compartment floor upper surface and a seat surface of the seat. The vehicle air conditioning duct device blows out conditioned air flowing in a duct, from the blowout port obliquely forward with respect to the seat.

In the vehicle air conditioning duct device of the present invention, conditioned air is blown out obliquely forward with respect to the seat from the blowout port provided at a position between the vehicle compartment floor upper surface and the seat surface of the seat. The conditioned air comes into contact with the vicinity of the calves of the occupant sitting on the seat positioned on a lateral side of the blowout port.

Thus, with the vehicle air conditioning duct device of the present invention, the occupant quickly perceives warmth in a cold season since conditioned air is blown out to the vicinity of the calves of the occupant.

Here, a vehicle air conditioning duct device of a conventional type, e.g., the vehicle air conditioning duct device of JP2000-79820(A) described above warms the vicinity of the knees of an occupant sitting on a rear seat, but does not warm the vicinity of the feet of an occupant sitting on a front seat.

For example, providing the rear rear-blowout-port of the vehicle air conditioning duct device of JP2000-79820(A) at a position below a front seat instead of a position below a rear seat, thereby warming the vicinity of the knees of an occupant sitting on the front seat, is also conceivable. However, in actuality, a general front seat slides in the front-rear direction, and the vehicle air conditioning duct device is difficult to be deformed or changed in the position thereof so as to follow sliding of the front seat, and thus, this plan is poor in feasibility.

As already described, in the vehicle air conditioning duct device of the present invention, the blowout port for conditioned air is provided to the housing disposed on a lateral side of a seat. Thus, if the housing is disposed on a lateral side of a front seat, an occupant sitting on the front seat is warmed, and if the housing is disposed on a lateral side of a rear seat, an occupant sitting on the rear seat is warmed. As a matter of course, if the housing is disposed on each of a lateral side of a front seat and a lateral side of a rear seat, both of the occupant sitting on the front seat and the occupant sitting on the rear seat are warmed.

In order to efficiently warm an occupant, exposing the calves of both legs of the occupant to conditioned air is appropriate.

The vehicle air conditioning duct device of the present invention blows out the conditioned air from the blowout port obliquely forward with respect to a seat. Therefore, part of the conditioned air comes into contact with a calf (referred to as "blowout-port-side calf" as necessary) on the side close to the blowout port out of the calves of the occupant. Then, the remainder of the conditioned air further advances obliquely forward to come into contact with a calf (referred to as "opposite-side calf" as necessary) on the side far from the blowout port out of the calves of the occupant. Accordingly, with the vehicle air conditioning duct device of the present invention, the calves of both legs of the occupant are exposed to the conditioned air, and the occupant quickly perceives warmth even in a cold season.

Since the blowout port described above is provided to the housing, the vehicle air conditioning duct device of the present invention need not be, for example, deformed following sliding of a seat.

Further, in the vehicle air conditioning duct device of the present invention, the housing provided with the blowout port is disposed on a side opposite to a vehicle door with respect to a seat.

For investigation of a reason why an occupant perceives chilliness or coldness at the feet even with the vehicle air conditioning duct device of the conventional type described above, the inventors of the present invention examined a factor other than the vehicle air conditioning duct device. Then, advancing the thought, the inventors of the present invention focused on a vehicle door as a vehicle component member present in the vicinity of a seat and having a possibility of functioning as a heat storage material or a thermal conductive material.

That is, a vehicle door is a vehicle component member having a large mass, and when a material having a large specific heat is used as a material of the vehicle door, the vehicle door has a possibility of functioning, in cold weather, as a cold-heat storage material for storing low-temperature heat, i.e., thermal energy having a temperature lower than normal temperature. When a material having a high thermal conductivity is used for the vehicle door, the vehicle door has a possibility of functioning as a thermal conductive material that conducts low-temperature heat outside the vehicle compartment into the vehicle compartment.

In general, the vehicle door is obtained by a metal-made or resin-made door base member being covered by a resin-made door trim. However, in some cases, the door trim itself functions as a heat storage material or a thermal conductive material described above, and unless the vehicle door itself is warmed, low-temperature heat of the door is supplied to the inside of the vehicle compartment through the door trim.

When a leg portion of the occupant comes into contact with the door trim, the occupant may perceive chilliness and feel uncomfortable.

The present inventors conceived of warming the door trim and the vehicle door by conditioned air having warmed the occupant, and completed the present invention.

That is, in the vehicle air conditioning duct device of the present invention, a housing provided with a blowout port is disposed on a lateral side of a seat and on a side opposite to a vehicle door with respect to the seat, and thus, conditioned air having passed both calves of the occupant is supplied to the vicinity of the vehicle door. Accordingly, with the vehicle air conditioning duct device of the present invention, the door trim and the vehicle door are warmed by the conditioned air having warmed the occupant. The conditioned air having reached the vehicle door is blocked by the vehicle door and stays between the vehicle door and the seat. Due to the warm staying air between the vehicle door and the seat, the temperature perceived by the occupant becomes higher than the actual temperature in the vehicle compartment.

Through this collaboration, the vehicle air conditioning duct device of the present invention quickly warms the occupant so as to be in a comfortable environment. That is, when compared with a conventional vehicle air conditioning duct device, the vehicle air conditioning duct device of the present invention has a further-improved air conditioning function.

Hereinafter, each component of the vehicle air conditioning duct device of the present invention will be described.

Unless otherwise mentioned in particular, a numerical value range of "x to y" described in the present specification includes, in the range thereof, a lower limit x and an upper limit y. A numerical value range may be formed by arbitrarily combining such upper limit values, lower limit values, and numerical values listed in the embodiment. In addition, numerical values arbitrarily selected within a numerical value range may be used as upper limit and lower limit numerical values.

Hereinafter, the flow path upstream side of conditioned air is simply referred to as "upstream side" and the flow path downstream side of conditioned air is simply referred to as "downstream side", as necessary.

The vehicle air conditioning duct device of the present invention has a housing, a blowout port, and a duct.

The housing is disposed on a lateral side of a seat in a vehicle and on a side opposite to a vehicle door with respect to the seat.

The housing only needs to have the duct disposed therein and have the blowout port provided thereto, and the shape and the like thereof is not limited in particular.

For example, the housing may be a housing dedicated to the vehicle air conditioning duct device of the present invention, or may be used in common with various types of vehicle interior equipment represented by a console box, a drink holder, a table, or the like.

The housing may be disposed between a driver seat and a passenger seat or may be disposed between two rear seats. The housing may extend from between the driver seat and the passenger seat to between two rear seats.

The housing is capable of having the duct disposed therein. In other words, the housing has an internal space capable of having the duct provided therein.

The entirety of the duct may be housed in the internal space, or a part of the duct may be exposed to the outside of the internal space, i.e., to the outside of the housing. In particular, an end portion on the upstream side of the duct is a portion communicating with the vehicle air conditioner. Therefore, when the efficiency of work of connecting the end portion on the upstream side of the duct and the vehicle air conditioner is taken into consideration, exposing an end portion on the upstream side of the duct, i.e., the end portion on the vehicle air conditioner side, to the outside of the housing is considered to be preferable. Preferably, the other portion of the duct is housed in the internal space and is not exposed to the outside of the housing.

The shape of the duct may be a straight tube shape, and may be a branched shape in which one end and/or the other end of the duct are branched into a plurality. The shape of the duct may be appropriately designed in accordance with the position of the blowout port for conditioned air, the position of the vehicle air conditioner, and the like.

Only the duct may be disposed in the internal space of the housing, or a vehicle-mounted device other than the duct may be disposed in addition to the duct. Examples of the vehicle-mounted device include a table, an audio device, a car navigation system or a monitor thereof, and a touch panel for operating various devices. Each of these vehicle-mounted devices may be regarded as a part of the vehicle air conditioning duct device of the present invention, or may be regarded as a device different from the vehicle air conditioning duct device of the present invention.

The housing has a blowout port as already described. The vehicle air conditioning duct device of the present invention may have only one blowout port, or may have a plurality of blowout ports. For example, when conditioned air is to be blown out only to the driver seat side by the vehicle air conditioning duct device of the present invention, only one blowout port may be provided, and when conditioned air is to be blown out in two directions, i.e., to the driver seat side and the passenger seat side, by the vehicle air conditioning duct device of the present invention, two blowout ports may be provided. The number and position of the blowout port(s) may be appropriately designed in accordance with the target to which conditioned air is blown.

The blowout port is provided at a position, in the housing, between the vehicle compartment floor upper surface and the seat surface of a seat. Since the blowout port is provided at the position, conditioned air is blown to the vicinity of the calves of an occupant sitting on the seat.

Particularly favorably, the position of the blowout port is a position corresponding to an area from the ankles to the vicinity of the middle portions of the calves of the occupant.

Specifically, the blowout port is preferably in a range of 50 mm to 300 mm above the vehicle compartment floor upper surface, more preferably in a range of 50 mm to 200 mm above the vehicle compartment floor upper surface, and particularly preferably in a range of 50 mm to 150 mm above the vehicle compartment floor upper surface.

Conditioned air blown out from the blowout port advances obliquely forward with respect to the seat. The method for adjusting the orientation of the conditioned air is not limited in particular, and various methods are adopted.

For example, when the blowout port itself is disposed so as to be directed obliquely forward with respect to the seat, conditioned air is blown out obliquely forward with respect to the seat.

When a fin for adjusting the direction of conditioned air is disposed inside the blowout port, the conditioned air is also blown out obliquely forward with respect to the seat. The fin will be described in detail later.

The shape of the blowout port is not limited in particular. However, in order to highly reliably blow conditioned air to the vicinity of the calves of an occupant sitting on a seat, the blowout port preferably has a slit shape.

For example, in the front-rear direction, in order to highly reliably blow conditioned air to the vicinity of the calves of an occupant sitting on a seat, favorably, the blowout port is disposed on a lateral surface on the seat side of the housing and the blowout port has a slit shape extending in the front-rear direction. The blowout port having the slit shape is particularly effective when the seat to which conditioned air is blown out is slidable in the front-rear direction.

The blowout port having the slit shape in this case is also considered to be one in which one end portion in the longitudinal direction of the blowout port is positioned to the front side relative to the other end portion thereof in the front-rear direction of the seat.

Here, for example, "one end portion in the longitudinal direction of the blowout port is positioned to the front side relative to the other end portion thereof in the front-rear direction of the seat" means that "the longitudinal direction of the blowout port is directed in substantially the same direction as the front-rear direction of the seat". The longitudinal direction of the blowout port need not necessarily match the front-rear direction of the seat, but the angle therebetween is preferably not greater than 90°, more preferably not greater than 45°, further preferably not greater than 30°, and particularly preferably not greater than 15°.

The "front-rear direction of the seat" is also considered as the "orientation of the seat", and matches the direction connecting the knees and the buttocks of the occupant sitting on the seat. The knee side of the occupant is the front side of the seat and the buttock side of the occupant is the rear side of the seat. The front-rear direction of a seat with respect to the vehicle air conditioning duct device of the present invention may be the same as, or may be different from, the traveling direction of the vehicle.

Alternatively, the blowout port having a slit shape may be disposed at the front surface of the housing. In this case, preferably, the blowout port has a slit shape extending in a direction connecting two seats. In this case, conditioned air is supplied to the two seats from one blowout port.

In this case, "the blowout port has a slit shape extending in a direction connecting two seats" means "the longitudinal direction of the blowout port is directed in substantially the same direction as the direction connecting the two seats". When the two seats are directed forward, the direction connecting the two seats is also considered as the width direction of the vehicle.

The longitudinal direction of the blowout port need not necessarily match the direction connecting the two seats, but the angle therebetween is preferably not greater than 90°, more preferably not greater than 45°, further preferably not greater than 30°, and particularly preferably not greater than 15°.

When the blowout port is disposed at a front portion of the housing, the vehicle air conditioning duct device of the present invention may have two blowout ports, i.e., one positioned on one side of the two seats, and one positioned on the other side of the two seats. Alternatively, the vehicle air conditioning duct device of the present invention may have one blowout port obtained by integrating the two blowout ports.

When the blowout port having a slit shape is disposed at a lateral portion of the housing, favorably, an inclined surface is provided at the lateral portion of the housing and the blowout port is provided at the inclined surface.

When the blowout port having a slit shape is disposed at a front portion of the housing, favorably, an inclined surface is provided at the front portion of the housing and the blowout port is provided at the inclined surface.

In each case, when the blowout port is disposed at a position that is between the upper surface of the vehicle floor and the seat surface of the seat and that is slightly close to the vehicle floor, the inclined surface favorably provided at the front portion or the lateral portion of the housing is inclined between: the rear side and the upper side; and the front side and the lower side.

When the blowout port having a slit shape is provided at such an inclined surface, conditioned air is blown out from the lower side toward the upper side. Therefore, in this case, even when the blowout port is on a slightly lower side, the conditioned air is highly reliably blown to the calves of the occupant.

In this case, favorably, a fin described later is disposed inside the blowout port and the conditioned air is further guided obliquely forward by the fin.

When the blowout port is disposed at a position that is between the upper surface of the vehicle floor and the seat surface of the seat and that is slightly close to the seat surface, the inclined surface favorably provided at the front portion or the lateral portion of the housing is inclined between: the rear side and the lower side; and the front side and the upper side.

When the blowout port having a slit shape is provided at such an inclined surface, conditioned air is blown out from the upper side toward the lower side. In this case as well, favorably, a fin described later is disposed inside the blowout port and the conditioned air is further guided obliquely forward by the fin.

Favorably, the vehicle air conditioning duct device of the present invention has a wind direction adjustment element disposed inside the blowout port. The wind direction adjustment element has at least one fin, and adjusts the direction of the conditioned air by means of the fin.

The wind direction adjustment element may have only one fin, or may have a plurality of fins. The fin may be fixed or may be rotatable with respect to the blowout port.

For example, when the blowout port has a large length in the longitudinal direction, favorably, a plurality of fins are provided. Then, favorably, the plurality of fins extend in a direction crossing the longitudinal direction of the blowout port and are arranged in a direction crossing the short direction of the blowout port. This is for adjusting the wind direction of the conditioned air so as to be uniform or substantially uniform along the longitudinal direction of the blowout port.

When the fin is rotatable, the fin is, directly or indirectly, pivotally supported with respect to the housing. As for the fin, the rotation range thereof includes an obliquely-guiding position at which the conditioned air is guided to be blown out obliquely forward with respect to a seat as a target.

When the blowout port is disposed at the lateral portion of the housing, the fin only needs to be inclined at the obliquely-guiding position from the rear side and the depth side toward the front side and the seat side. In some cases, the fin may be further inclined from the lower side toward the upper side.

When the blowout port is disposed at the front portion of the housing as well, the fin only needs to be inclined at the obliquely-guiding position from the rear side and the depth side toward the front side and the seat side. In some cases, the fin may be further inclined from the lower side toward the upper side.

In this case, when the vehicle air conditioning duct device of the present invention has two blowout ports, i.e., one positioned on one side of the two seats, and one positioned on the other side of the two seats as described above, fins respectively directed to different directions may be selected as the fins disposed at the respective blowout ports.

When one of two seats is defined as a driver seat and the other of the two seats is defined as a passenger seat, the fin disposed at the blowout port positioned on the driver seat side only needs to be inclined from the rear side and the depth side toward the front side and the driver seat side, with respect to the driver seat. As for the fin disposed at the blowout port positioned on the passenger seat side as well, the fin only needs to be inclined from the rear side and the depth side toward the front side and the passenger seat side, with respect to the passenger seat.

In the case of one blowout port obtained by integrating two blowout ports as described above, similarly, the fin disposed in a region on the driver seat side in the blowout port only needs be inclined from the rear side and the depth side toward the front side and the driver seat side, with respect to the driver seat. The fin disposed in a region on the passenger seat side in the blowout port only needs to be inclined from the rear side and the depth side toward the front side and the passenger seat side, with respect to the passenger seat.

Favorably, the wind direction adjustment element has an input part for adjusting the position of the fin. Favorably, the input part has a shape, e.g., a dial shape or a knob shape, operable by a hand of the occupant. In some cases, an operation fin itself being one fin may function as the input part.

When the wind direction adjustment element has an open/close damper for opening/closing a flow path for the conditioned air in the duct, the wind direction adjustment element may further have an input part for opening/closing the open/close damper.

In particular, favorably, the wind direction adjustment element having a plurality of fins has an operation part for rotating each fin in synchronization, in addition to each fin.

Specifically, favorably, the operation part has a link coupling each fin, and the above-described input part connected to the link.

Favorably, the input part is disposed in the vicinity of the blowout port so as to allow the occupant to easily perform operation.

To be more specific, particularly preferably, the input part is disposed on the upper side of the blowout port and exposed to the outside of the housing, or is integrated with the operation fin being one of a plurality of fins.

In order to cause the conditioned air blown out from the blowout port to come into contact with the calves of an occupant sitting on a seat, the blowout port is preferably disposed at a position slightly forward with respect to the seat. Specifically, the position of the front end of the blowout port with respect to a seat is preferably on the front side relative to the center of the seat in the front-rear direction, and more preferably positioned to the front with respect to the front end of the seat.

Meanwhile, as already described, the conditioned air blown out from the blowout port advances obliquely forward with respect to the seat. Therefore, the blowout port being positioned excessively forward with respect to the seat is not preferable. Specifically, the front end of the blowout port is favorably on the rear side relative to the position 15 cm forward from the front end of the seat, more favorably on the rear side relative to the position 12 cm forward from the front end of the seat, and particularly favorably on the rear side relative to the position 10 cm forward from the front end of the seat.

When the blowout port has a slit shape, the ratio between the length in the longitudinal direction and the length in the short direction of the blowout port is not limited in particular. However, from the viewpoint of energy saving, preferably, the flow path cross-sectional area of the blowout port is not too large. In other words, a smaller length in the short direction of the blowout port is preferable.

Meanwhile, when pressure loss of the vehicle air conditioning duct device is taken into consideration, the length in the short direction of the blowout port is preferably large to some extent. Therefore, there are preferable ranges for the length in the longitudinal direction and the length in the short direction of the blowout port having a slit shape.

Specifically, the length in the longitudinal direction of the blowout port having a slit shape is preferably not less than twice the length in the short direction, more preferably not less than three times, further preferably not less than five times, and particularly preferably not less than ten times.

The length in the short direction of the blowout port having a slit shape, i.e., the thickness of the blowout port, is preferably not less than 15 mm, more preferably not less than 18 mm, and particularly preferably not less than 20 mm.

For reference, the inventors of the present invention actually performed measurement and found the following. When the length in the short direction of the blowout port was not less than 15 mm, pressure loss of the vehicle air conditioning duct device was not greater than 80 pa. When the length was not less than 18 mm, pressure loss of the vehicle air conditioning duct device was not greater than 65 pa. When the length was not less than 20 mm, pressure loss of the vehicle air conditioning duct device was not greater than 50 pa.

The vehicle air conditioning duct device of the present invention may further include a heat exchanger for performing heat exchange with cooling water of an engine, and a vehicle air conditioner such as a heating, ventilation, and air-conditioning (HVAC). Further, the vehicle air conditioning duct device of the present invention may include: another blowout port represented by the foot blowout port in the already-described vehicle air conditioning duct device for foot or a rear blowout port that is provided at rear of a center console box and from which conditioned air is blown out rearward; and a duct connected to the vehicle air conditioner and the other blowout port.

Examples of another aspect of the vehicle air conditioning duct device of the present invention understood from the above description include [1] to [3] below.

[1] A vehicle air conditioning duct device including:

a vehicle air conditioner being a heat source;

a housing disposed on a lateral side of a seat and on a side opposite to a vehicle door with respect to the seat;

a blowout port provided at a position, in the housing, between a vehicle compartment floor upper surface and a seat surface of the seat; and a duct having therein a flow path for conditioned air, the duct being disposed, at least partially, inside the housing and connected to the vehicle air conditioner and the blowout port, the vehicle air conditioning duct device being configured to blow out the conditioned air from the blowout port obliquely forward with respect to the seat.

[2] A vehicle air conditioning duct device including:

a housing disposed on a lateral side of a seat and on a side opposite to a vehicle door with respect to the seat;

a blowout port provided at a position, in the housing, between a vehicle compartment floor upper surface and a seat surface of the seat;

a second blowout port disposed at a position different from that of the blowout port and being open in a vehicle compartment;

a duct having therein a flow path for conditioned air, the duct being disposed, at least partially, inside the housing and connected to a vehicle air conditioner and the blowout port; and a second duct connected to the vehicle air conditioner and the second blowout port, the vehicle air conditioning duct device being configured to blow out the conditioned air from the blowout port obliquely forward with respect to the seat.

[3] A vehicle air conditioning duct device including:

a vehicle air conditioner being a heat source;

a housing disposed on a lateral side of a seat and on a side opposite to a vehicle door with respect to the seat;

a blowout port provided at a position, in the housing, between a vehicle compartment floor upper surface and a seat surface of the seat;

a second blowout port disposed at a position different from that of the blowout port and being open in a vehicle compartment;

a duct having therein a flow path for conditioned air, the duct being disposed, at least partially, inside the housing and connected to the vehicle air conditioner and the blowout port; and a second duct connected to the vehicle air conditioner and the second blowout port, the vehicle air conditioning duct device being configured to blow out the conditioned air from the blowout port obliquely forward with respect to the seat.

Hereinafter, the vehicle air conditioning duct device of the present invention will be described with reference to specific examples.

Example 1

Figure 2:
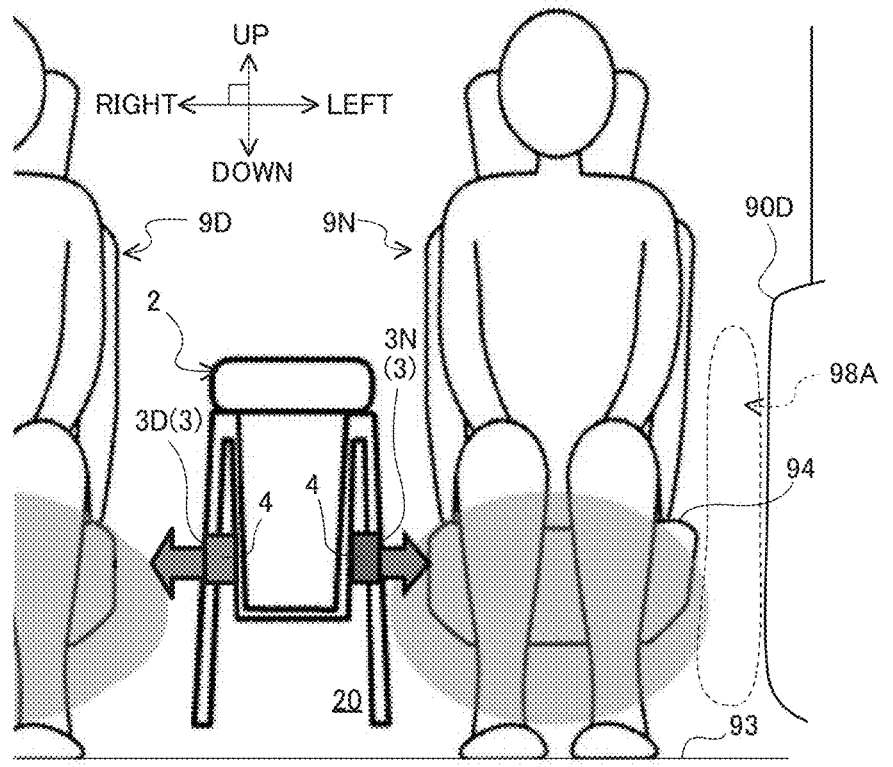
FIG. 2 schematically illustrates, in a front view, the vehicle air conditioning duct device of Example 1 in the vehicle compartment.
Figure 3:
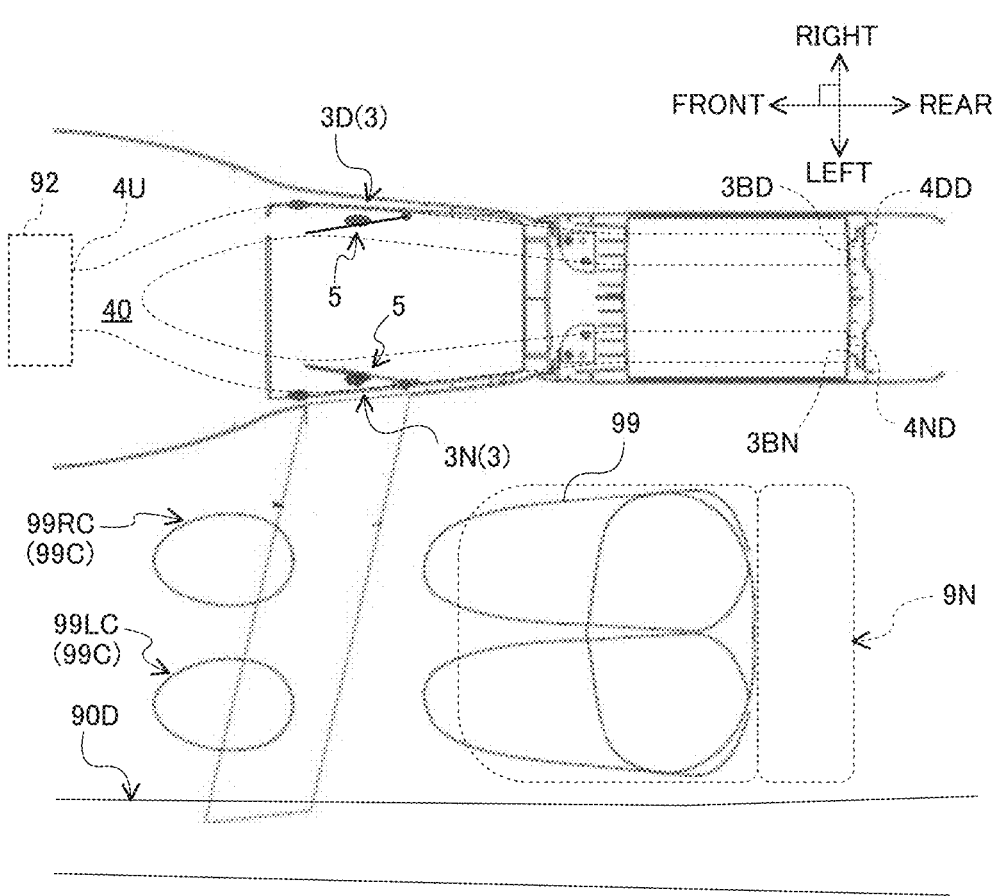
FIG. 3 schematically illustrates a positional relationship between a blowout port of the vehicle air conditioning duct device of Example 1 and the calves of an occupant.
Figure 4:
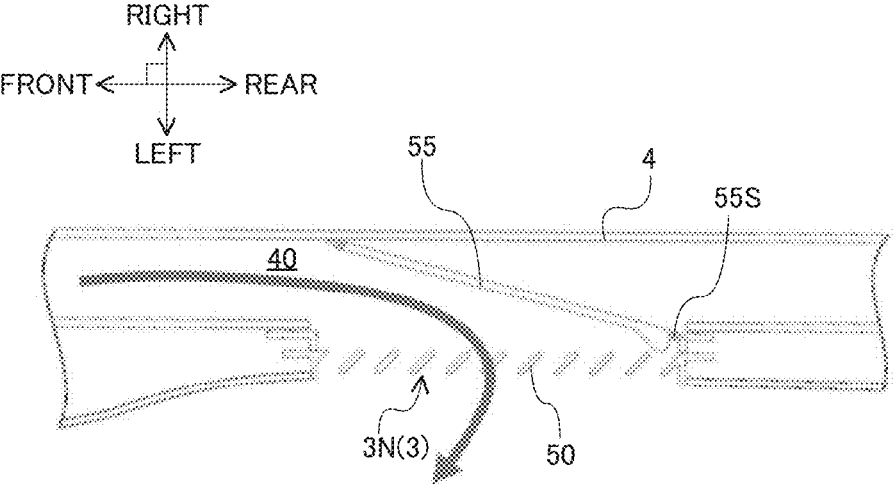
FIG. 4 schematically illustrates a wind direction adjustment element of the vehicle air conditioning duct device of Example 1.
Figure 5:
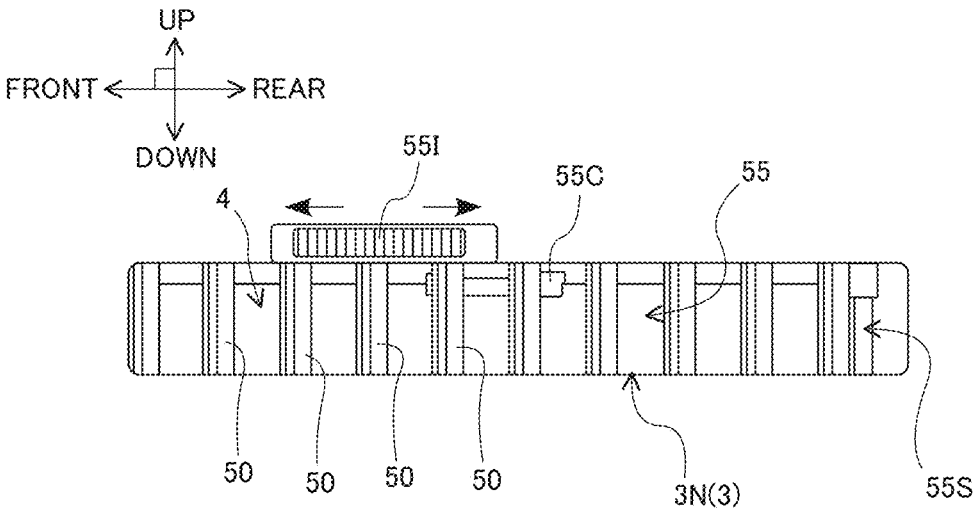
FIG. 5 schematically illustrates the wind direction adjustment element of the vehicle air conditioning duct device of Example 1.
Figure 6:
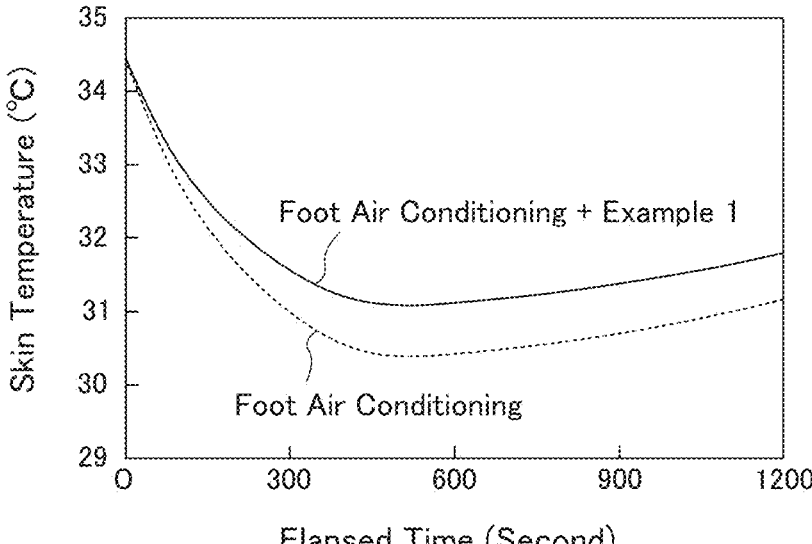
FIG. 6 illustrates a result of Test Example 1.
Figure 7:
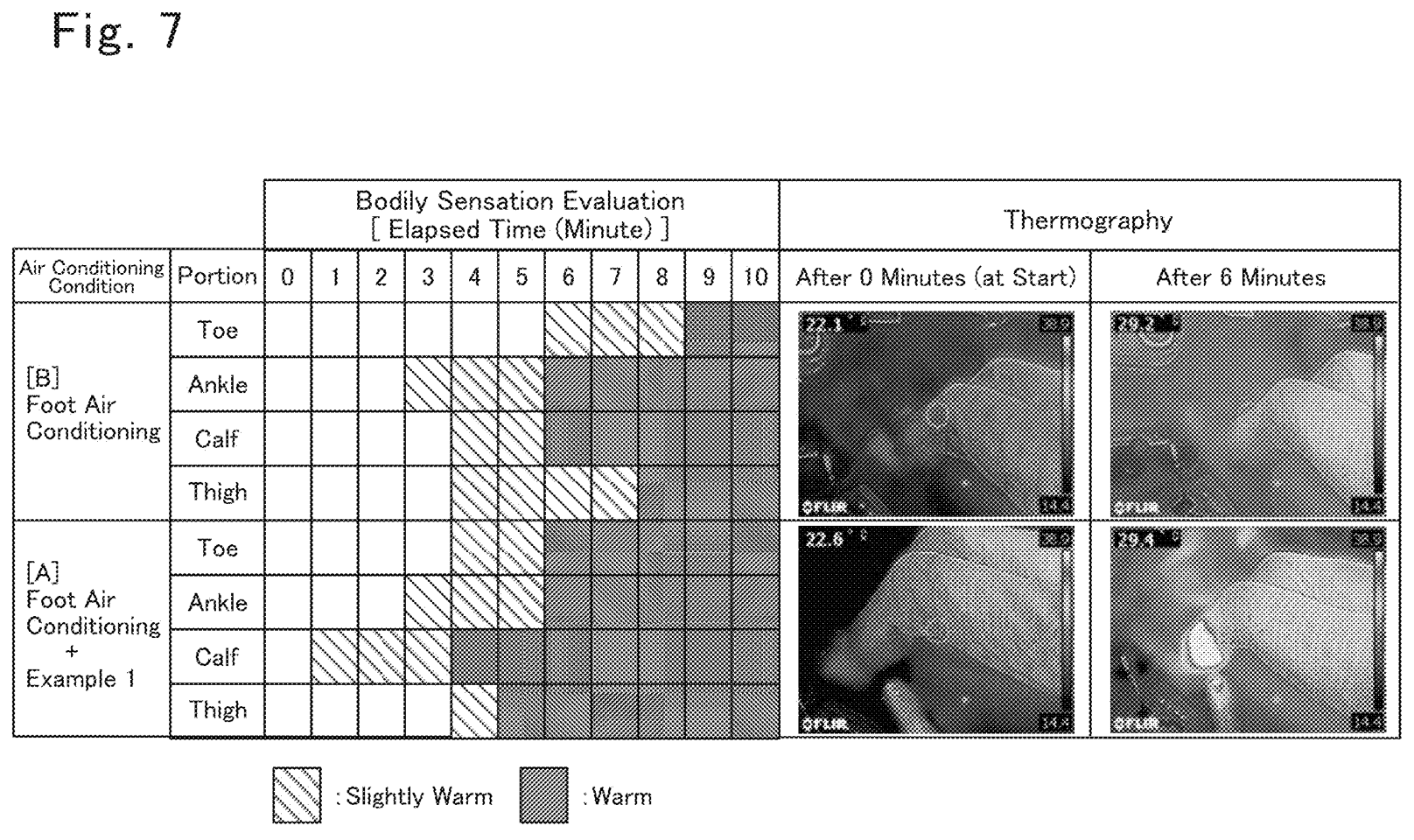

FIG. 1 schematically illustrates, in a side view, a vehicle air conditioning duct device of Example 1 in a vehicle compartment. FIG. 2 schematically illustrates, in a front view, the vehicle air conditioning duct device of Example 1 in the vehicle compartment. FIG. 3 schematically illustrates a positional relationship between the blowout port of the vehicle air conditioning duct device of Example 1 and the calves of an occupant. FIG. 4 and FIG. 5 schematically illustrate a wind direction adjustment element in the vehicle air conditioning duct device of Example 1. FIG. 6 illustrates a result of Test Example 1. FIG. 7 illustrates a result of Test Example 2.

Hereinafter, upper and lower mean the upper side and the lower side in the vertical direction, and front, rear, left, and right mean the front, the rear, the left, and the right in the traveling direction of the vehicle. The left-right direction is the width direction of the vehicle and the front-rear direction is the traveling direction of the vehicle.

As shown in FIG. 1 and FIG. 2, a vehicle air conditioning duct device 1 of Example 1 has a housing 2, a blowout port 3, a duct 4, and a wind direction adjustment element 5.

The housing 2 of the vehicle air conditioning duct device 1 of Example 1 is also used as a center console box being one type of vehicle interior equipment.

As shown in FIG. 2, the housing 2 is disposed between a driver seat 9D and a passenger seat 9N.

The housing 2 is disposed on a lateral side of the driver seat 9D and is disposed on a side opposite to a driver-seat-side vehicle door (not shown) with respect to the driver seat 9D. The housing 2 is disposed on a lateral side of the passenger seat 9N and is disposed on a side opposite to a passenger-seat-side vehicle door 90D with respect to the passenger seat 9N.

The housing 2 has a box shape having an internal space 20, and the blowout ports 3 are disposed, one by one, at left and right lateral portions of the housing 2, respectively. One blowout port 3 is referred to as a driver-seat-side blowout port 3D, and the other blowout port 3 is referred to as a passenger-seat-side blowout port 3N.

Further, two rear blowout ports 3B from which conditioned air is blown out rearward are disposed at a rear portion of the housing 2. Details of the blowout port 3 will be described later.

The duct 4 has a substantially tubular shape having therein a flow path 40 for conditioned air. An upstream-side end portion 4U being one end of the duct 4 is connected to an HVAC 92. The other end side of the duct 4, i.e., the downstream side, is branched into two.

One of the downstream-side portions of the duct 4 is positioned on the driver seat 9D side, and an opening is provided in the peripheral wall thereof. The driver-seat-side blowout port 3D is connected to the opening. A downstream-side end portion 4DD of the duct 4 is connected to one rear blowout port 3BD.

The other of the downstream-side portions of the duct 4 is positioned on the passenger seat 9N side, and an opening is provided in the peripheral wall thereof. The passenger-seat-side blowout port 3N is connected to the opening. A downstream-side end portion 4DN of the duct 4 is connected to the other rear blowout port 3BN.

The driver-seat-side blowout port 3D and the passenger-seat-side blowout port 3N are in left-right symmetry, and other than this, are substantially the same with each other.

Hereinafter, the passenger-seat-side blowout port 3N will be described, and the passenger-seat-side blowout port 3N may be read as the driver-seat-side blowout port 3D as appropriate.

The passenger-seat-side blowout port 3N is provided at a position between a vehicle compartment floor upper surface 93 and a seat surface 94 of the passenger seat 9N. As shown in FIG. 1, as for the passenger-seat-side blowout port 3N, the longitudinal direction is directed in the front-rear direction and the short direction thereof is directed in the up-down direction.

The position of the passenger-seat-side blowout port 3N of the vehicle air conditioning duct device 1 of Example 1 is on the front side with respect to the front end of the passenger seat 9N and the front end of the passenger-seat-side blowout port 3N is on the rear side relative to the position 15 cm forward from the front end of the passenger seat 9N.

The length in the longitudinal direction of the passenger-seat-side blowout port 3N is not less than ten times the length in the short direction. Further, the length in the short direction of the passenger-seat-side blowout port 3N, i.e., the thickness of the passenger-seat-side blowout port 3N, is about 18 mm.

The wind direction adjustment element 5 is disposed inside the passenger-seat-side blowout port 3N. The wind direction adjustment element 5 is also considered to be disposed inside the duct 4, while being inside and on the depth side of the passenger-seat-side blowout port 3N.

As shown in FIG. 4, the wind direction adjustment element 5 has a plurality of fins 50 and an open/close damper 55.

The plurality of fins 50 are arranged along the front-rear direction, i.e., the longitudinal direction of the passenger-seat-side blowout port 3N, and are fixed with respect to the passenger-seat-side blowout port 3N.

Each fin 50 extends in the up-down direction and the left-right direction. Each fin 50 is also considered to extend in the short direction of the passenger-seat-side blowout port 3N.

Each fin 50 is inclined from the rear side and the right side (i.e., the depth side of the blowout port 3) toward the front side and the left side (i.e., the passenger seat 9N side). Each fin 50 guides conditioned air flowing in the duct 4, obliquely forward with respect to the passenger seat 9N. Therefore, each fin 50 is considered to be disposed at an obliquely-guiding position.

As shown in FIG. 4, the open/close damper 55 is disposed inside the duct 4 and opens/closes a portion, of the duct 4, leading to the rear blowout port 3BN. The open/close damper 55 is pivotally supported at the duct 4 and is rotatable with respect to the duct 4. As shown in FIG. 5, a rotation shaft 55S of the open/close damper 55 is connected through a connection member 55C to a damper input part 551 having a dial shape. In the vehicle air conditioning duct device 1 of Example 1, the connection member 55C is composed of a plurality of gears.

The damper input part 551 is exposed to the upper side of the passenger-seat-side blowout port 3N, on the outer side of a left lateral portion of the housing 2.

When the damper input part 551 is operated in a damper closing direction indicated by a left arrow in FIG. 5, a portion, of the duct 4, leading to the rear blowout port 3BN is closed as shown in FIG. 4. Accordingly, conditioned air flowing in the duct 4 is blown out from the passenger-seat-side blowout port 3N obliquely forward with respect to the passenger seat 9N, but is not supplied to the rear blowout port 3BN (not shown).

When the damper input part 551 is operated in a damper opening direction indicated by a right arrow in FIG. 5, the portion, of the duct 4, leading to the rear blowout port 3BN is opened. Accordingly, conditioned air flowing in the duct 4 is blown out from the passenger-seat-side blowout port 3N obliquely forward with respect to the passenger seat 9N, and in addition, the conditioned air is blown out from the rear blowout port 3B rearward to a rear seat (not shown).

Operation of the vehicle air conditioning duct device 1 of Example 1 will be described below.

Warm conditioned air obtained at the HVAC 92 is supplied to the duct 4 of the vehicle air conditioning duct device 1 of Example 1. The conditioned air flows in the flow path 40 of the duct 4 and advances toward the downstream side. The conditioned air is supplied to the passenger-seat-side blowout port 3N connected to a portion, of the duct 4, on the downstream side relative to the upstream-side end portion 4U.

As described above, the wind direction adjustment element 5 is disposed inside the passenger-seat-side blowout port 3N (FIG. 4). The wind direction adjustment element 5 has the plurality of fins 50 inclined from the rear side and the right side toward the front side and the left side. Therefore, the conditioned air flowing in the duct 4 is guided by each fin 50 to be blown out from the passenger-seat-side blowout port 3N obliquely forward with respect to the passenger seat 9N.

At this time, as shown in FIG. 2 and FIG. 3, the conditioned air is blown out toward calves 99C of an occupant 99 sitting on the passenger seat 9N.

More specifically, first, the conditioned air comes into contact with a calf 99RC (i.e., the already-described blowout-port-side calf) of the right leg of the occupant 99 sitting on the passenger seat 9N, and next, comes into contact with a calf 99LC (i.e., the already-described opposite-side calf) of the left leg of the occupant 99. Accordingly, the calves 99C of the occupant 99 sitting on the passenger seat 9N are quickly and sufficiently warmed, and accordingly, the entirety of the body of the occupant 99 is quickly and sufficiently warmed.

Then, the conditioned air further comes into contact with the passenger-seat-side vehicle door 90D. Accordingly, the passenger-seat-side vehicle door 90D including the door trim is warmed. In other words, with the vehicle air conditioning duct device 1 of Example 1, the passenger-seat-side vehicle door 90D is warmed by waste heat having warmed the occupant 99 sitting on the passenger seat 9N side. Accordingly, even when the occupant 99 sitting on the passenger seat 9N accidentally touches the passenger-seat-side vehicle door 90D, perception of chilliness by the occupant 99 is avoided.

Since the vehicle door is warmed, the occupant 99 sitting on the passenger seat 9N is warmed due to thermal conduction from the passenger-seat-side vehicle door 90D. Further, the conditioned air having come into contact with the passenger-seat-side vehicle door 90D stays between the passenger-seat-side vehicle door 90D and the passenger seat 9N. As a result, as shown in FIG. 2, a warm staying air 98A is formed between the passenger-seat-side vehicle door 90D and the passenger seat 9N. Accordingly, the temperature perceived by the occupant 99 is higher than the actual temperature in the vehicle compartment.

Through this collaboration, with the vehicle air conditioning duct device 1 of Example 1, the occupant 99 is less likely to perceive chilliness or coldness at the feet even in cold weather. That is, the vehicle air conditioning duct device 1 of Example 1 has a further-improved air conditioning function when compared with the vehicle air conditioning duct device 1 of a conventional type.

Test Example 1

In addition to the vehicle air conditioning duct device 1 of Example 1, a vehicle air conditioning duct device for foot (not shown) for heating the feet of the occupant 99 sitting on the passenger seat 9N was connected to the same HVAC 92. The vehicle air conditioning duct device for foot is referred to as "foot air conditioning" as necessary.

The skin temperature of the occupant 99 sitting on the passenger seat 9N when the air temperature was 0° C., the set temperature of the HVAC 92 was 35° C., the flow rate of the vehicle air conditioning duct device 1 of Example 1 was 30 m³/h, and the flow rate of the foot air conditioning was 50 m³/h, was calculated through simulation.

As a control test, the skin temperature of the occupant 99 sitting on the passenger seat 9N when the air temperature was 0° C., the set temperature of the HVAC 92 was 35° C., the vehicle air conditioning duct device 1 of Example 1 was not used, and the flow rate of the foot air conditioning was 100 m³/h, was calculated through simulation.

FIG. 6 shows the result of Test Example 1.

As shown in FIG. 6, when the vehicle air conditioning duct device 1 of Example 1 was used in combination with the foot air conditioning, the skin temperature of the occupant 99 was about 0.6° C. higher than that when only the foot air conditioning was used and the vehicle air conditioning duct device 1 of Example 1 was not used.

This result supports the fact that the vehicle air conditioning duct device 1 of Example 1 exhibits an excellent air conditioning function.

Test Example 2

The vehicle air conditioning duct device 1 of Example 1 and foot air conditioning similar to that in Test Example 1 were mounted to an actual vehicle.

[A] The sensible temperature of the occupant 99 sitting on the passenger seat 9N when the air temperature was 0° C., the set temperature of the HVAC 92 was 35° C., the flow rate of the vehicle air conditioning duct device 1 of Example 1 was 30 m³/h, and the flow rate of the foot air conditioning was 50 m³/h, was evaluated.

[B] As a control test, the sensible temperature of the occupant 99 sitting on the passenger seat 9N when the air temperature was 0° C., the set temperature of the HVAC 92 was 35° C., the vehicle air conditioning duct device 1 of Example 1 was not used, and the flow rate of the foot air conditioning was 100 m³/h, was evaluated.

The sensible temperature was evaluated in two categories of "warm" and "slightly warm."

FIG. 7 shows the result of Test Example 2.

As shown in FIG. 7, in [A] in which the vehicle air conditioning duct device 1 of Example 1 was used in combination with the foot air conditioning, the time until the occupant 99 perceived that the toes were warm was shorter than that in [B] in which only the foot air conditioning was used and the vehicle air conditioning duct device 1 of Example 1 was not used. Specifically, in the case of [A] above, the occupant 99 perceived warmth at the toes as much as three minutes earlier than in [B] above.

With respect to the temperature at the feet of the occupant 99, the size of the region having a relatively high temperature and displayed whitish in the thermography image in [A] above is considered to be equivalent to or greater than that in [B] above. In [A] above, the temperature in the vicinity of the calves 99C was high in particular.

This result also supports the fact that the vehicle air conditioning duct device 1 of Example 1 exhibits an excellent air conditioning function.

Reference Example

Figure 8:
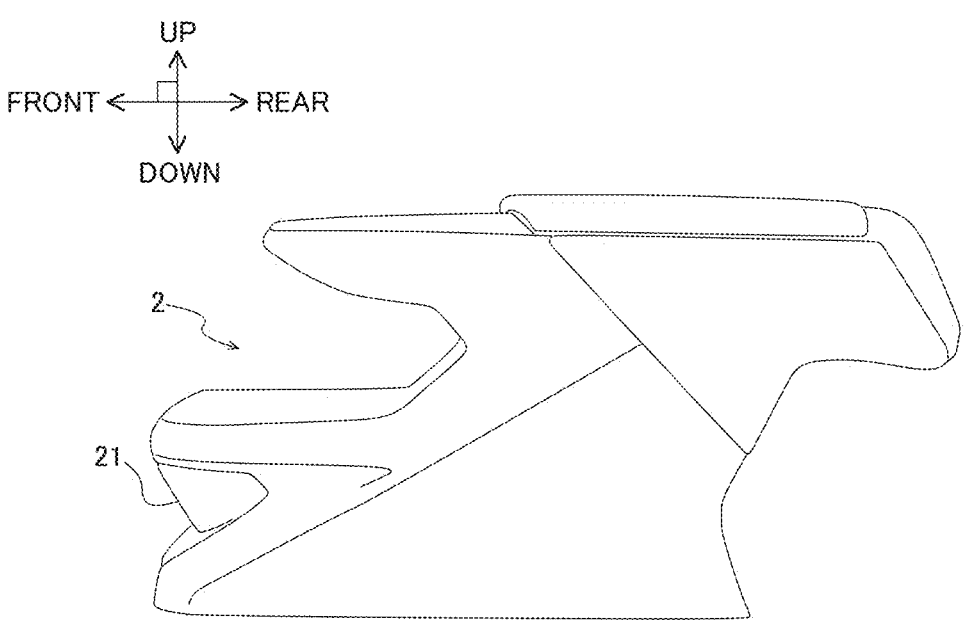
FIG. 8 schematically illustrates a housing of Reference Example capable of having provided thereto the blowout port of the vehicle air conditioning duct device of the present invention.

In Example 1 described above, the driver-seat-side blowout port 3D and the passenger-seat-side blowout port 3N are provided at lateral portions of the center console box being the housing 2. However, the blowout port 3 of the vehicle air conditioning duct device 1 of the present invention may also be provided at a front portion of the housing 2. FIG. 8 schematically illustrates the housing 2 of Reference Example capable of having provided thereto the blowout port 3 of the vehicle air conditioning duct device 1 of the present invention.

As shown in FIG. 8, the housing 2 of Reference Example has an inclined surface 21 at a front portion thereof. The inclined surface 21 is at a position that is between the vehicle compartment floor upper surface 93 and the seat surface 94 of a seat and that is slightly close to the seat surface 94, and is inclined between: the rear side and the lower side; and the front side and the upper side.

When the blowout port 3 is provided at the inclined surface 21, conditioned air is blown out from the upper side toward the lower side through the blowout port 3 being slightly close to the seat surface 94, i.e., being on a slightly upper side. Accordingly, the conditioned air is highly reliably blown to the calves 99C of the occupant 99.

Example 2

Figure 9:
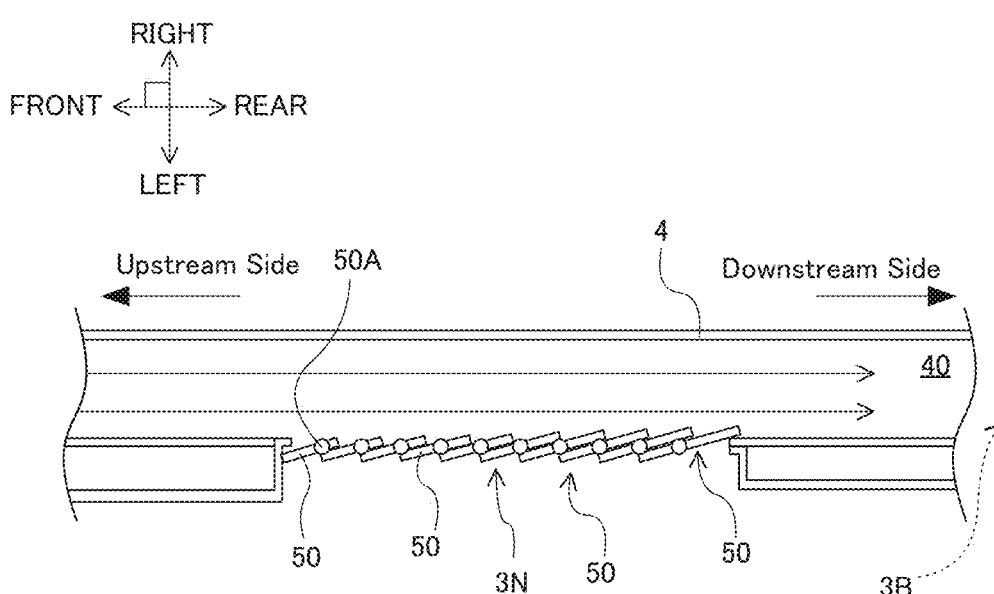
FIG. 9 schematically illustrates the wind direction adjustment element of the vehicle air conditioning duct device of Example 2.
Figure 10:
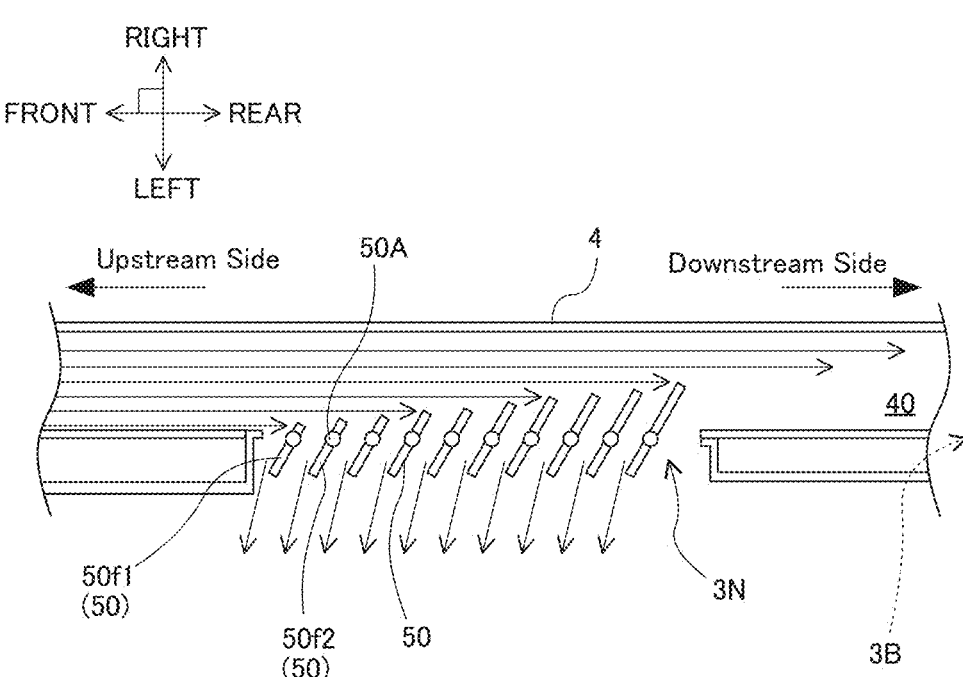
FIG. 10 schematically illustrates the wind direction adjustment element of the vehicle air conditioning duct device of Example 2.

The vehicle air conditioning duct device 1 of Example 2 is substantially the same as the vehicle air conditioning duct device 1 of Example 1 except for the wind direction adjustment element 5. FIG. 9 and FIG. 10 schematically illustrate the wind direction adjustment element 5 of the vehicle air conditioning duct device 1 of Example 2.

Hereinafter, the vehicle air conditioning duct device 1 of Example 2 will be described mainly with respect to a difference, i.e., the wind direction adjustment element 5, from the vehicle air conditioning duct device 1 of Example 1.

As shown in FIG. 9, the wind direction adjustment element 5 of the vehicle air conditioning duct device 1 of Example 2 has a plurality of fins 50, and does not have the open/close damper 55. The plurality of fins 50 are arranged along the longitudinal direction of the passenger-seat-side blowout port 3N, and each rotate about a rotation shaft 50A.

More specifically, the fins 50 each have a strip-like shape extending in the up-down direction and the left-right direction, are coupled by a link (not shown), and rotate in synchronization with each other in a rotation range including a closed position shown in FIG. 9 and an obliquely-guiding position shown in FIG. 10.

As shown in FIG. 10, the length of each fin 50 is increased from the front side, i.e., the upstream side, toward the rear side, i.e., the downstream side, and the fins 50 are arranged with their left ends aligned.

Therefore, the protrusion length of each fin 50 inside the duct 4 is increased from the fins 50 on the upstream side toward the fins 50 on the downstream side.

In other words, the projected areas of the respective fins 50 when projected in the axial direction of the duct 4 are considered to increase from the fins 50 on the upstream side toward the fins 50 on the downstream side.

The projected areas are also considered as the areas of the respective fins 50 when projected from the front side toward the rear side. Alternatively, the projected areas are also considered as the areas of the respective fins 50 when projected from the rear side toward the front side.

At the closed position shown in FIG. 9, the projected area of each fin 50 in a direction orthogonal to the axial direction is minimized. In the vehicle air conditioning duct device of Example 2, the wind direction adjustment element 5 is a so-called fin shut register, and at the closed position, the respective fins 50 overlap each other to close the passenger-seat-side blowout port 3N.

Operation of each fin 50 is performed by operating a fin input part (not shown). The fin input part is connected to the link (not shown) described above. Similar to the damper input part 551 of the vehicle air conditioning duct device of Example 1, the fin input part has a dial shape, and is exposed to the upper side of the passenger-seat-side blowout port 3N, on the outer side of the left lateral portion of the housing 2.

At the obliquely-guiding position shown in FIG. 10, each fin 50 is inclined from the rear side and the right side toward the front side and the left side, and is disposed at the obliquely-guiding position. At this time, each fin 50 guides conditioned air flowing in the duct 4, obliquely forward with respect to the passenger seat 9N.

Therefore, at this time, the conditioned air is blown out toward the calves 99C of the occupant 99 sitting on the passenger seat 9N. The calves 99C of the occupant 99 sitting on the passenger seat 9N are quickly and sufficiently warmed by the conditioned air, and accordingly, the entirety of the body of the occupant 99 is quickly and sufficiently warmed.

The conditioned air having been blown out from the passenger-seat-side blowout port 3N and having passed the calves 99C of the occupant 99 sitting on the passenger seat 9N further comes into contact with the passenger-seat-side vehicle door 90D, and warms the passenger-seat-side vehicle door 90D. Further, the conditioned air having come into contact with the passenger-seat-side vehicle door 90D stays between the passenger-seat-side vehicle door 90D and the passenger seat 9N to form the warm staying air 98A between the passenger-seat-side vehicle door 90D and the passenger seat 9N.

Through the collaboration above, with the vehicle air conditioning duct device 1 of Example 2, the occupant 99 is less likely to perceive chilliness or coldness at the feet even in cold weather.

Further, as shown in FIGS. 9, 10, the conditioned air having reached the downstream side of the wind direction adjustment element 5 in the flow path 40 of the duct 4 further flows toward the downstream side, i.e., the rear blowout port 3B, and is blown out from the rear blowout port 3B rearward to a rear seat (not shown).

In the vehicle air conditioning duct device of Example 2, when the fins 50 are at the closed position as shown in FIG. 9, the passenger-seat-side blowout port 3N is closed by the respective fins 50, and substantially all the amount of the conditioned air flowing in the duct 4 is supplied to the rear blowout port 3B.

When the respective fins 50 are at a position other than the closed position, for example, when the respective fins 50 are at the obliquely-guiding position as shown in FIG. 10, the passenger-seat-side blowout port 3N is opened. At this time, in the flow path 40 of the duct 4, the protrusion length of each fin 50 increases. That is, at this time, each fin 50 interferes with the flow path 40 for the conditioned air.

Here, as shown in FIG. 10, the protrusion lengths of the respective fins 50 in the inside of the duct 4, i.e., in the flow path 40, gradually increase from the fins 50 on the upstream side toward the fins 50 on the downstream side. In other words, the projected areas of the respective fins 50 gradually increase from the fins 50 on the upstream side toward the fins 50 on the downstream side. Accordingly, the flow path cross-sectional area of the duct 4 in the direction orthogonal to the axial direction of the duct 4 gradually decreases from the upstream side toward the downstream side on the depth side of the passenger-seat-side blowout port 3N.

Since the fins 50 are arranged as described above, out of the conditioned air flowing in the flow path 40 of the duct 4, the conditioned air flowing on the left side of the duct 4, i.e., on the passenger-seat-side blowout port 3N side, comes into contact with a fin 50/1 positioned on the most upstream side out of the fins 50. Then, the conditioned air is guided by the fin 50/1 to change the flow path, is supplied to the passenger-seat-side blowout port 3N, and is blown out obliquely forward from the passenger-seat-side blowout port 3N toward the passenger seat 9N.

The remainder of the conditioned air, i.e., the conditioned air not having come into contact with the fin 50/1, advances toward the downstream side. Then, out of the conditioned air not having come into contact with the fin 50/1, the conditioned air flowing on the passenger-seat-side blowout port 3N side of the duct 4 comes into contact with a fin 50/2 adjacent, on the rear side, i.e., on the downstream side, to the fin 50/1 and having a larger protrusion length than that of the fin 50/1, is guided by the fin 50/2 to be supplied to the passenger-seat-side blowout port 3N, and is blown out obliquely forward from the passenger-seat-side blowout port 3N toward the passenger seat 9N.

As described above, the conditioned air flowing in the flow path 40 of the duct 4 is sequentially guided to the passenger-seat-side blowout port 3N by the respective fins 50 arranged in the axial direction. Meanwhile, out of the conditioned air flowing in the flow path of the duct 4, the conditioned air flowing on the right side, i.e., on the side opposite to the passenger-seat-side blowout port 3N, of the duct 4 does not come into contact with the fins 50, straightly advances toward the downstream side, passes through the rear blowout port 3B, and is blown out toward a rear portion of the vehicle compartment, i.e., a rear seat. Accordingly, the conditioned air flowing in the duct 4 is distributed by the fins 50 provided therein, to the passenger-seat-side blowout port 3N and the rear blowout port 3B. Therefore, although the vehicle air conditioning duct device 1 of Example 2 has the duct 4 having a straight tube shape, the vehicle air conditioning duct device 1 of Example 2 favorably distributes the conditioned air to both of a flow route passing through the passenger-seat-side blowout port 3N and a flow route passing through the rear blowout port 3B.

As already described, the protrusion lengths of the respective fins 50 in the flow path 40 of the duct 4 gradually increase from the fins 50 on the upstream side toward the fins 50 on the downstream side, and the projected areas of the respective fins 50 also gradually increase from the fins 50 on the upstream side toward the fins 50 on the downstream side. Therefore, out of the fins 50, those present in a portion on the downstream side come into contact with the conditioned air flowing in a region away from the passenger-seat-side blowout port 3N in the flow path 40 of the duct 4.

The conditioned air having come into contact with the fins 50 present on the downstream side is supplied to a region, of the passenger-seat-side blowout port 3N, on the downstream side to which a sufficient amount of the conditioned air is less likely to be supplied. Therefore, with the vehicle air conditioning duct device of Example 2, a sufficient amount of the conditioned air is supplied to the passenger-seat-side blowout port 3N over the entire region in the longitudinal direction thereof. Therefore, although the passenger-seat-side blowout port 3N has a shape extending along the axial direction of the duct 4, i.e., the flow direction of the conditioned air, ununiformity in the amount of the conditioned air supplied to the passenger-seat-side blowout port 3N is reduced, and accordingly, ununiformity in the amount of the conditioned air blown out from the passenger-seat-side blowout port 3N is reduced.

In the vehicle air conditioning duct device 1 of Example 2, the flow path cross-sectional area of the duct 4 in the direction orthogonal to the axial direction on the depth side of the passenger-seat-side blowout port 3N when the fins 50 are at the obliquely-guiding position (see FIG. 10) is not less than 20 area % of that when the fins 50 are at the closed position (see FIG. 9). Therefore, the vehicle air conditioning duct device 1 of Example 2 has an advantage that a sufficient amount of the conditioned air is supplied to the rear blowout port 3B even when the passenger-seat-side blowout port 3N is opened by the fins 50.

Although the present invention has been described above, the present invention is not limited to the embodiment and the like described above. Various modifications can be made without departing from the gist of the present invention by, for example, extracting and combining as appropriate elements described in the embodiment and the like.

In addition, the specification of the present invention is not limited to the technological idea according to the citation relationship of the claims at the time of filing of the application, and discloses a technological idea in which matters described in the claims are combined as appropriate.

The invention claimed is:

1. A vehicle air conditioning duct device comprising:
    a housing disposed on a lateral side of a seat and on a side opposite to a vehicle door with respect to the seat;
    a blowout port provided at a position, in the housing, between a vehicle compartment floor upper surface and a seat surface of the seat;
    a duct having therein a flow path for conditioned air, the duct being disposed, at least partially, inside the housing and connected to a vehicle air conditioner and the blowout port; and
    a wind direction adjustment element having at least one fin and disposed inside the blowout port, wherein
    the vehicle air conditioning duct device is configured to blow out the conditioned air from the blowout port obliquely forward with respect to the seat,
    the fin is rotatable in a rotation range including an obliquely-guiding position at which the fin is inclined from a rear side and a depth side toward a front side and a seat side with respect to the blowout port,
    the wind direction adjustment element has the fin, an operation part for rotating the fin, an open/close damper, and an operation part for rotating the open/close damper, an input part to be operated by an occupant is disposed on an upper side of the blowout port and exposed to outside of the housing, the input part is included in the operation part for rotating the fin, or the input part is included in the operation part for rotating the open/close damper, the open/close damper is on the depth side of the fin with respect to the blowout port, and the open/close damper is rotatable in a rotation range including a damper obliquely-guiding position at which the open/close damper is inclined from the front side and the depth side to the rear side and the seat side.

\* \* \* \* \*